US012755547B2

(12) United States Patent
Kalva et al.

(10) Patent No.: US 12,755,547 B2
(45) Date of Patent: Oct. 6, 2026

(54) SYSTEMS AND METHODS FOR PRIVACY PROTECTION IN VIDEO COMMUNICATION SYSTEMS

(71) Applicant: OP Solutions LLC, Amherst, MA (US)

(72) Inventors: Hari Kalva, Boca Raton, FL (US); Borivoje Furht, Boca Raton, FL (US); Velibor Adzic, Canton, GA (US)

(73) Assignee: OP Solutions LLC, Amherst, MA (US)

( * ) Notice: Subject to any disclaimer, the term of this patent is extended or adjusted under 35 U.S.C. 154(b) by 0 days.

(21) Appl. No.: 18/747,640

(22) Filed: Jun. 19, 2024

(65) Prior Publication Data

US 2024/0338486 A1 Oct. 10, 2024

Related U.S. Application Data

(63) Continuation of application No. PCT/US2023/010449, filed on Jan. 10, 2023.

(60) Provisional application No. 63/299,683, filed on Jan. 14, 2022.

(51) Int. Cl.

| | |
|---|---|
| ***G06F 21/62*** | (2013.01) |
| ***H04N 19/184*** | (2014.01) |
| ***H04N 19/46*** | (2014.01) |
| ***H04N 19/70*** | (2014.01) |

(52) U.S. Cl.

CPC ....... *G06F 21/6254* (2013.01); *H04N 19/184* (2014.11); *H04N 19/46* (2014.11); *H04N 19/70* (2014.11)

(58) Field of Classification Search

None

See application file for complete search history.

(56) References Cited

U.S. PATENT DOCUMENTS

2020/0184103 A1* 6/2020 Matusek ................ G06V 20/41

FOREIGN PATENT DOCUMENTS

WO WO-2021053261 A1 * 3/2021 ....... H04N 21/44055

* cited by examiner

*Primary Examiner* — Jeffrey R Swearingen

(74) *Attorney, Agent, or Firm* — OP Solution IP Department; Paul Ackerman

(57) ABSTRACT

An image transmission system with privacy protection includes a privacy request processor which receives a request to secure at least one object type in an image prior to transmission of the image to a receiving system. An object detector receives the image data from a camera and processes the image data to identify at least one predetermined object type in the image data. An object scrambler receives a set of protected objects from the privacy request processor and receives the image data with identified objects of the predetermined object type and operates to obscure the image data for any identified objects identified as protected objects prior to encoding and transmission to a remote receiver site.

7 Claims, 10 Drawing Sheets

SYSTEMS AND METHODS FOR PRIVACY PROTECTION IN VIDEO COMMUNICATION SYSTEMS

CROSS REFERENCE TO RELATED APPLICATIONS

This application is a continuation of international application PCT/US2023/010449 filed on Jan. 10, 2023, and titled SYSTEMS AND METHODS FOR PRIVACY PROTECTION IN VIDEO COMMUNICATION SYSTEMS, which application claims the benefit of priority to U.S. Provisional application Ser. No. 63/299,683 filed on Jan. 14, 2022, and titled SYSTEMS AND METHODS FOR PRIVACY PROTECTION IN VIDEO COMMUNICATION SYSTEMS, the entirety of each of which is hereby incorporated by reference.

FIELD OF THE INVENTION

The present invention generally relates to the field of video encoding and decoding. In particular, the present invention is directed to systems and methods for privacy protection in image/video communication systems.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, case of editing, random access, end-to-end delay (e.g., latency), and the like.

Motion compensation can include an approach to predict a video frame or a portion thereof given a reference frame, such as previous and/or future frames, by accounting for motion of the camera and/or objects in the video. It can be employed in the encoding and decoding of video data for video compression, for example in the encoding and decoding using the Motion Picture Experts Group (MPEG)'s advanced video coding (AVC) standard (also referred to as H.264). Motion compensation can describe a picture in terms of the transformation of a reference picture to the current picture. The reference picture can be previous in time when compared to the current picture, from the future when compared to the current picture. When images can be accurately synthesized from previously transmitted and/or stored images, compression efficiency can be improved.

While video content is often considered for human consumption, there is a growing need for video in industrial settings and other settings in which the contend is evaluated by machines rather than humans.

Recent trends in robotics, surveillance, monitoring, Internet of Things, etc. introduced use cases in which significant portion of all the images and videos that are recorded in the field is consumed by machines only, without ever reaching human eyes. Those machines process images and videos with the goal of completing tasks such as object detection, object tracking, segmentation, event detection etc. Recognizing that this trend is prevalent and will only accelerate in the future, international standardization bodies established efforts to standardize image and video coding that is primarily optimized for machine consumption. For example, standards like JPEG AI and Video Coding for Machines are initiated in addition to already established standards such as Compact Descriptors for Visual Search, and Compact Descriptors for Video Analytics. Further improving encoding and decoding of video for consumption by machines and in hybrid systems in which video is consumed by both a human viewer and a machine is, therefore, of growing importance in the field.

In many applications, such as surveillance systems with multiple cameras, intelligent transportation, smart city applications, and/or intelligent industry applications, traditional video coding may require compression of large number of videos from cameras and transmission through a network for both machine consumption and for human consumption. Subsequently, at a machine site, algorithms for feature extraction may applied typically using convolutional neural networks or deep learning techniques including object detection, event action recognition, pose estimation and others.

In some cases, the transmission of image/video data can raise privacy concerns. Indeed, in some jurisdictions, the transmission of personally identifying information may be considered a violation of individual rights and may be illegal, especially if there is a data breach. It is desirable, therefore, to have systems in which privacy interests can be protected, such as by obscuring certain features in an image/video, prior to transmission of the content to a remote location.

SUMMARY OF THE DISCLOSURE

An image transmission system with privacy protection includes a privacy request processor which receives a request to secure at least one object type in an image prior to transmission of the image to a receiving system. A camera is provided for generating image data. An object detector receives the image data from the camera and processes the image data to identify at least one predetermined object type in the image data. An object scrambler receives a set of protected objects from the privacy request processor and receives the image data with identified objects of the predetermined object type. The object scrambler operates to obscure the image data for any identified objects identified as protected objects. An encoder receives the image data with obscured protected objects and generates an encoded bitstream for transmission to a receiving station.

The object types to secure can be determined at least in part by the location of the system. In some embodiments, the privacy request processor has a default set of object types to secure. Alternatively or additionally, the privacy request processor can receive a set of object types to secure from a service provider.

The encoded bitstream preferably includes parameters related to the applied privacy protection used to obscure the image data. The parameters can include a flag indicating whether the bitstream provides privacy protection. The flag can be signaled in one of a picture level, a sub-picture level, a slice level, a sequence level, or a group of frames level. In some embodiments, the parameters can include signaling information in each picture header. Alternatively, the parameters can be signaled in the supplemental enhancement information (SEI) stream.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Privacy protection is often context sensitive since information considered sensitive may depend on applications and scenarios. In cases where the identity of individuals needs to be protected, faces of individuals can be detected and redacted/scrambled to hide their identity. However, when the vehicle tag or number plate of the car an individual is driving is revealed, that information could be a privacy breach because of the identifying information therein. Similarly, revealing a tattoo on a person or a bumper sticker on car may also be deemed a breach of privacy. The physical or geographical location of a picture may leak privacy and also reveal identifying information. Identify many be revealed when information extracted from a video or image is combined with other sources of information.

In a use case such as video surveillance, a receiver of the video needs the context and details of how privacy protection was provided. Privacy related context can be added to compressed video bitstream such as a Versatile Video Coding (VVC) or VCM (Video Coding for Machines). The privacy context included in bitstreams will allow receivers better understand levels of privacy and provide services with privacy assurances.

Privacy protections in video recordings may be necessary because of local rules and regulations. In view of growing privacy concerns, some governments require the removal of certain identifiable information in a video.

Figure 1:
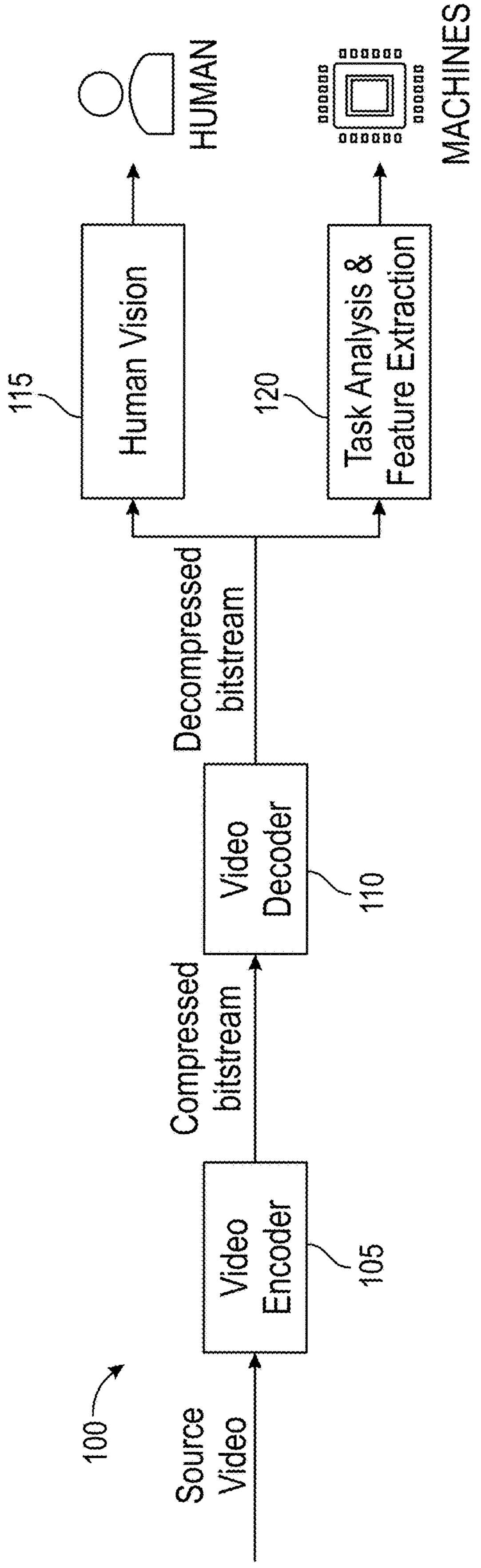
FIG. 1 is a block diagram illustrating an exemplary embodiment of a video coding system.

FIG. 1 shows an exemplary embodiment of a VVC compliant coding/decoding system which includes a channel applied for machines. Conventional approaches unfortunately, may require a massive video transmission from multiple cameras, which may take significant time for efficient and fast real-time analysis and decision-making. In certain embodiments, a VCM approach may resolve this problem by both encoding video and extracting some features at a transmitter site and then transmitting a resultant encoded bit stream to a VCM decoder. At a decoder site, video may be decoded for human vision and features may be decoded for machines. As used herein, the term VCM refers broadly to video coding and decoding for machine consumption and is not limited to a specific proposed protocol.

A "feature," as used in this disclosure, is a specific structural and/or content attribute of data. Examples of features may include SIFT, audio features, color hist, motion hist, speech level, loudness level, or the like. Features may be time stamped. Each feature may be associated with a single frame of a group of frames. Features may include high level content features such as timestamps, labels for persons and objects in the video, coordinates for objects and/or regions-of-interest, frame masks for region-based quantization, and/or any other feature that may occur to persons skilled in the art upon reviewing the entirety of this disclosure. As a further non-limiting example, features may include features that describe spatial and/or temporal characteristics of a frame or group of frames. Examples of features that describe spatial and/or temporal characteristics may include motion, texture, color, brightness, edge count, blur, blockiness, or the like.

At a decoder site it will be appreciated that video may be decoded for human vision and features may be decoded for machines. Systems which provide video for both human vision and for machine consumption are sometimes referred to as hybrid systems. The systems and methods disclosed herein are intended to apply to machine-based systems as well as hybrid systems.

FIG. 1 is a high-level block diagram of a system for encoding and decoding video in a hybrid system which includes consumption of the video content by both human viewers and machine consumption. A source video is received by a video encoder 105 which provides a compressed bitstream for transmission over a channel to video decoder 110. The video encoder may encode the video for human consumption as well as encoding the video for machine consumption. The video decoder 110 provides complimentary processing on the compressed bitstream to extract the video for human vision 115 as well as task analysis and feature extraction 120 for machine consumption. Feature extraction can be classified as any computer vision task, such as edge detection, line detection, object detection, or more recent techniques such as convolutional neural networks where the output of the feature extraction can be spatially mapped back onto the pixel space of the input video. Video coding can include any standard video encoder and/or encoding techniques such as, for example, Advanced Video Codec (AVC), Versatile Video Coding (VVC), or High Efficiency Video Coding (HEVC).

Figure 2:
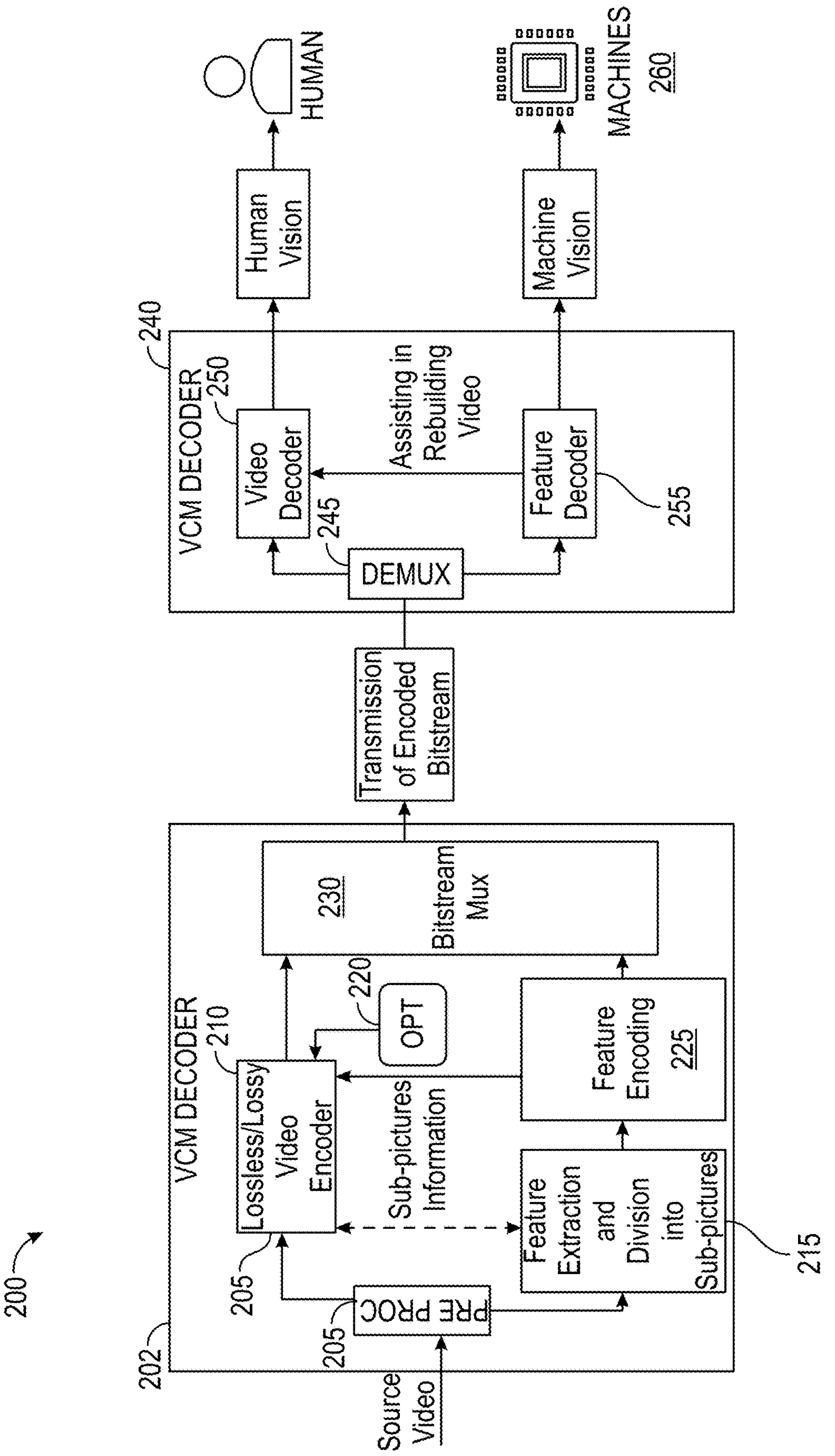
FIG. 2 is a block diagram illustrating an exemplary embodiment of a video coding for machines system.

Referring now to FIG. 2, an exemplary embodiment of encoder for video coding for machines (VCM) is illustrated. VCM encoder 202 may be implemented using any circuitry including without limitation digital and/or analog circuitry; VCM encoder 202 may be configured using hardware configuration, software configuration, firmware configuration, and/or any combination thereof. VCM encoder 202 may be implemented as a computing device and/or as a component of a computing device, which may include without limitation any computing device as described below. In an embodiment, VCM encoder 202 may be configured to receive an input video 204 and generate an output bitstream 208. Reception of an input video 204 may be accomplished in any manner described below. A bitstream may include, without limitation, any bitstream as described below.

VCM encoder 202 may include, without limitation, a pre-processor 206, a video encoder 210, a feature extractor 215, an optimizer 220, a feature encoder 225, and/or a multiplexor 230. Pre-processor 206 may receive input video 204 stream and parse out video, audio and metadata sub-streams of the stream. Pre-processor 206 may include and/or communicate with decoder as described in further detail below; in other words, Pre-processor 206 may have an ability to decode input streams. This may allow, in a non-limiting example, decoding of an input video 204, which may facilitate downstream pixel-domain analysis.

Further referring to FIG. 2, VCM encoder 202 may operate in a hybrid mode and/or in a video mode; when in the hybrid mode VCM encoder 200 may be configured to encode a visual signal that is intended for human consumers, to encode a feature signal that is intended for machine consumers; machine consumers may include, without limitation, any devices and/or components, including without limitation computing devices as described in further detail below. Input signal may be passed, for instance when in hybrid mode, through pre-processor 206.

Still referring to FIG. 2, video encoder 210 may include without limitation any video encoder 210 as described in further detail below. When VCM encoder 202 is in hybrid mode, VCM encoder 202 may send unmodified input video 204 to video encoder 210 and a copy of the same input video 204, and/or input video 204 that has been modified in some way, to feature extractor 215. Modifications to input video 204 may include any scaling, transforming, or other modification that may occur to persons skilled in the art upon reviewing the entirety of this disclosure. For instance, and without limitation, input video 204 may be resized to a smaller resolution, a certain number of pictures in a sequence of pictures in input video 204 may be discarded, reducing framerate of the input video 204, color information may be modified, for example and without limitation by converting an RGB video might be converted to a grayscale video, or the like.

Still referring to FIG. 2, video encoder 210 and feature extractor 215 are connected and might exchange useful information in both directions. For example, and without limitation, video encoder 210 may transfer motion estimation information to feature extractor 220, and vice-versa. Video encoder 210 may provide Quantization mapping and/or data descriptive thereof based on regions of interest (ROI), which video encoder 210 and/or feature extractor 215 may identify, to feature extractor 215, or vice-versa. Video encoder 210 may provide to feature extractor 215 data describing one or more partitioning decisions based on features present and/or identified in input video 204, input signal, and/or any frame and/or subframe thereof; feature extractor 218 may provide to video encoder 210 data describing one or more partitioning decisions based on features present and/or identified in input video 204, input signal, and/or any frame and/or subframe thereof. Video encoder 210 feature extractor 215 may share and/or transmit to one another temporal information for optimal group of pictures (GOP) decisions. Each of these techniques and/or processes may be performed, without limitation, as described in further detail below.

With continued reference to FIG. 2, feature extractor 220 may operate in an offline mode or in an online mode. Feature extractor 220 may identify and/or otherwise act on and/or manipulate features. A "feature," as used in this disclosure, is a specific structural and/or content attribute of data. Examples of features may include SIFT, audio features, color hist, motion hist, speech level, loudness level, or the like. Features may be time stamped. Each feature may be associated with a single frame of a group of frames. Features may include high level content features such as timestamps, labels for persons and objects in the video, coordinates for objects and/or regions-of-interest, frame masks for region-based quantization, and/or any other feature that may occur to persons skilled in the art upon reviewing the entirety of this disclosure. As a further non-limiting example, features may include features that describe spatial and/or temporal characteristics of a frame or group of frames. Examples of features that describe spatial and/or temporal characteristics may include motion, texture, color, brightness, edge count, blur, blockiness, or the like. When in offline mode, all machine models as described in further detail below may be stored at encoder and/or in memory of and/or accessible to encoder. Examples of such models may include, without limitation, whole or partial convolutional neural networks, keypoint extractors, edge detectors, salience map constructors, or the like. When in online mode one or more models may be communicated to feature extractor 220 by a remote machine in real time or at some point before extraction.

Still referring to FIG. 2, feature encoder 225 is configured for encoding a feature signal, for instance and without limitation as generated by feature extractor 220. In an embodiment, after extracting the features feature extractor 220 may pass extracted features to feature encoder 225. Feature encoder 225 may use entropy coding and/or similar techniques, for instance and without limitation as described below, to produce a feature stream, which may be passed to multiplexor 230. Video encoder 210 and/or feature encoder 225 may be connected via optimizer 220; optimizer 220 may exchange useful information between the video encoder 210 and feature encoder 225. For example, and without limitation, information related to codeword construction and/or length for entropy coding may be exchanged and reused, via optimizer 220, for optimal compression.

In an embodiment, and continuing to refer to FIG. 2, video encoder 210 may produce a video stream; video stream may be passed to multiplexor 230. Multiplexor 230 may multiplex video stream with a feature stream generated by feature encoder 225; alternatively or additionally, video and feature bitstreams may be transmitted over distinct channels, distinct networks, to distinct devices, and/or at distinct times or time intervals (time multiplexing). Each of video stream and feature stream may be implemented in any manner suitable for implementation of any bitstream as described in this disclosure. In an embodiment, multiplexed video stream and feature stream may produce a hybrid bitstream, which may be is transmitted as described in further detail below.

Still referring to FIG. 2, where VCM encoder 200 is in video mode, VCM encoder 200 may use video encoder 210 for both video and feature encoding. Feature extractor 220 may transmit features to video encoder 210; the video encoder 210 may encode features into a video stream that may be decoded by a corresponding video decoder 250. It should be noted that VCM encoder 200 may use a single video encoder 210 for both video encoding and feature encoding, in which case it may use different set of parameters for video and features; alternatively, VCM encoder 200 may two separate video encoder 210*s*, which may operate in parallel.

Still referring to FIG. 2, system 200 may include and/or communicate with, a VCM decoder 240. VCM decoder 240 and/or elements thereof may be implemented using any circuitry and/or type of configuration suitable for configuration of VCM encoder 200 as described above. VCM decoder 240 may include, without limitation, a demultiplexor 245. Demultiplexor 245 may operate to demultiplex bitstreams if multiplexed as described above. For instance and without limitation, demultiplexor 245 may separate a multiplexed bitstream containing one or more video bitstreams and one or more feature bitstreams into separate video and feature bitstreams.

Continuing to refer to FIG. 2, VCM decoder 240 may include a video decoder 250. Video decoder 250 may be implemented, without limitation in any manner suitable for a decoder as described in further detail below. In an embodiment, and without limitation, video decoder 250 may generate an output video, which may be viewed by a human or other creature and/or device having visual sensory abilities.

Still referring to FIG. 2, VCM decoder 240 may include a feature decoder 255. In an embodiment, and without limitation, feature decoder 255 may be configured to provide one or more decoded data to a machine. Machine may include, without limitation, any computing device as described below, including without limitation any microcontroller, processor, embedded system, system on a chip, network node, or the like. Machine may operate, store, train, receive input from, produce output for, and/or otherwise interact with a machine model as described in further detail below. Machine may be included in an Internet of Things (IOT), defined as a network of objects having processing and communication components, some of which may not be conventional computing devices such as desktop computers, laptop computers, and/or mobile devices. Objects in IoT may include, without limitation, any devices with an embedded microprocessor and/or microcontroller and one or more components for interfacing with a local area network (LAN) and/or wide-area network (WAN); one or more components may include, without limitation, a wireless transceiver, for instance communicating in the 2.4-2.485 GHz range, like BLUETOOTH transceivers following protocols as promulgated by Bluetooth SIG, Inc. of Kirkland, Wash, and/or network communication components operating according to the MODBUS protocol promulgated by Schneider Electric SE of Rueil-Malmaison, France and/or the ZIGBEE specification of the IEEE 802.15.4 standard promulgated by the Institute of Electronic and Electrical Engineers (IEEE). Persons skilled in the art, upon reviewing the entirety of this disclosure, will be aware of various alternative or additional communication protocols and devices supporting such protocols that may be employed consistently with this disclosure, each of which is contemplated as within the scope of this disclosure.

With continued reference to FIG. 2, each of VCM encoder 202 and/or VCM decoder 240 may be designed and/or configured to perform any method, method step, or sequence of method steps in any embodiment described in this disclosure, in any order and with any degree of repetition. For instance, each of VCM encoder 202 and/or VCM decoder 240 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Each of VCM encoder 202 and/or VCM decoder 240 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 3:
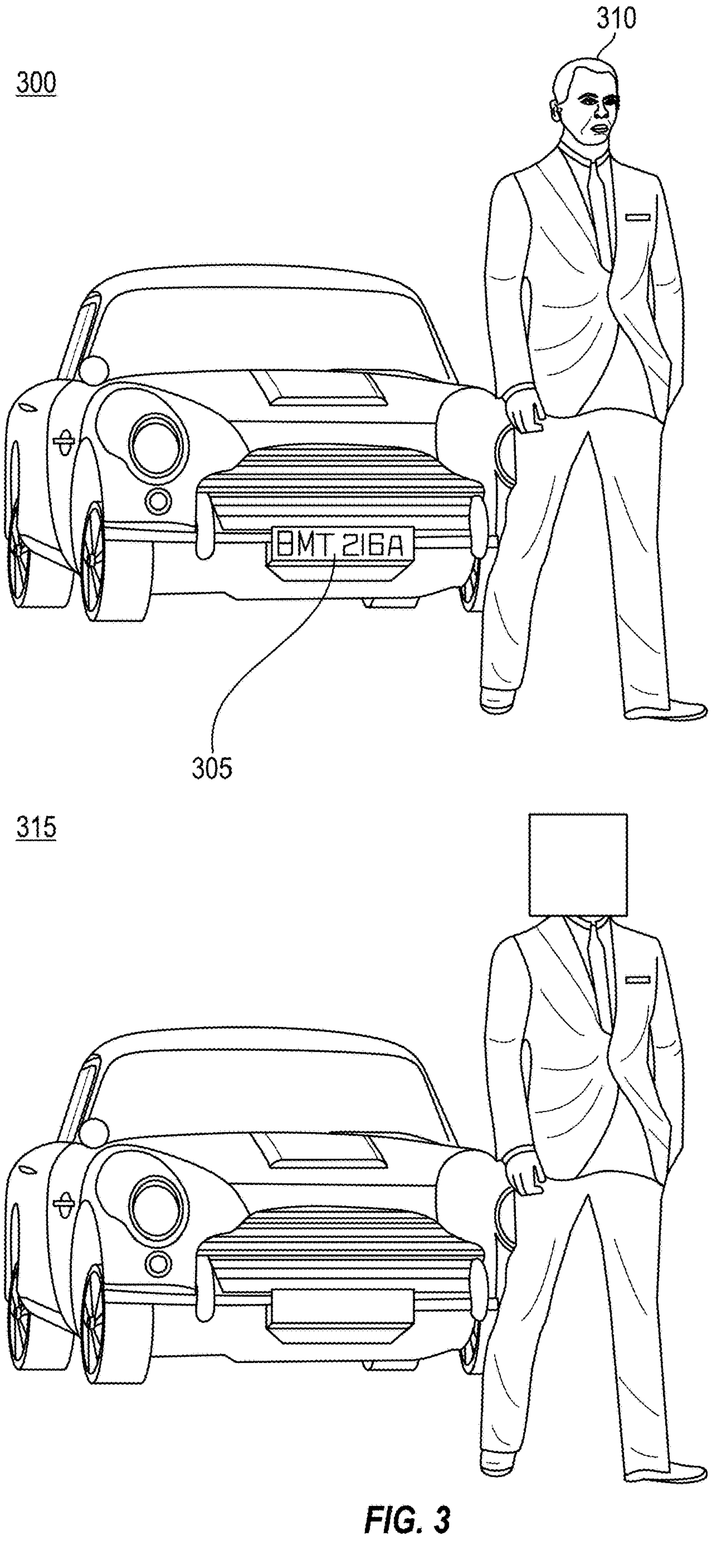
FIG. 3 is a screenshot illustrating an exemplary embodiment of a frame with privacy protection applied.

Referring now to FIG. 3, an example is provided of a video frame and/or picture with exemplary privacy information 300 such as license plate numbers 305 and/or faces 310 and the same frame 315 with the privacy information obscured and/or removed.

Signaling that a bitstream is privacy protected may not be sufficient for a receiver to understand the mechanisms used to provide privacy. A video system supporting privacy protection, therefore, will preferably provide context to indicate the level of privacy protection. A video stream can include additional context for privacy by signaling a list of object types that are scrambled to promote privacy. E.g., human face, number plate, street name, car model etc. The system can make the service more useful by including the detection performance to provide better context. E.g., faces detected with minimum confidence of 75%. Minimum confidence to detect and scramble face. Total faces detected. Total faces scrambled.

Example Syntax for Signaling Privacy Protection Information

In order to convey the context information to a receiving system, the sending system 400 can encode information in the bitstream, such as using the following exemplary syntax elements.

| | Descriptor |
|---|---|
| frame_privacy_protection_information_enabled | u(1) |
| | u(1) |
| if( frame_privacy_protection_information_enabled ) { | |
| frame_privacy_protection_information( ) | |
| } | |

| | Descriptor |
|---|---|
| frame_privacy_protection_information( ) { | |
| fpp_num_object_classes_minus1 | u(8) |
| for(i=0; i <= fpp_num_object_classes_minus1; i++){ | u(1) |
| fpp_object_class_name_length | u(8) |

-continued

| | Descriptor |
|---|---|
| fpp_object_class_name [fpp_object_class_name_length] | |
| fpp_object_count | u(8) |
| fpp_object_detector_id | u(8) |
| fpp_total_objects_detected | u(8) |
| fpp_total_objects_protected | u(8) |
| fpp_min_confidence_of_protected_object | u(8) |
| } | |
| } | |

frame_privacy_protection_information_enabled—when this flag is set to 1, signals that the video bitstream provides privacy protection. When this flag is set to 0, signals that the video bitstream does not provide any privacy protection. This flag can be signaled at picture level, sub-picture level, slice level or sequence or group of frames level (applies until updated by another occurrence of the flag).

frame_privacy_protection_information( )—this frame protection data can be included in each picture header. Some implementation may include this information in the supplemental enhancement information (SEI) stream and not in the main video bitstream.

fpp_num_object_classes_minus1—number of object classes protected in this frame minus one.

fpp_object_class_name_length—number of bytes to describe the object class name fpp_object_class_name—object class name (e.g., face, person, car, book)

fpp_object_count—number of objects of this class detected in the current picture fpp_object_detector_id—object detector used. Object detectors may be identified using an index from a list of detectors described elsewhere in the bitstream. Alternatively, object detectors may be identified using a well-known name (e.g., Yolo3, detectron2). Yet another alternative is to use object detector IDs that are known to the receiver (e.g., using the product ID of the camera or video system used).

fpp_total_objects_detected—total of objects of this class detected in this frame.

fpp_total_objects_protected—total of objects of this class protected in this frame. The difference between fpp_total_objects_detected and fpp_total_objects_protected gives the number of objects below the detection confidence threshold used by the system.

fpp_min_confidence_of_protected_object—this is integer in the range [0, 100] that indicates minimum confidence of the detector used as a threshold for scrambling/protecting an object of this class. For example, the system may protect only objects that have been detected with a confidence of 50% or higher. In that case fpp_min_confidence_of_protected_object is 50.

Receiver Request for Privacy Protection

Privacy requirements are application dependent and may change over time. A system that is responsive to privacy requests can serve privacy requirements better and is beneficial to service providers. In such systems, receiver can send a request to the camera/sender with information on what objects to protect. This information is sent to the camera/sender over a communication channel between the receiver and the sender. Such communication can be implemented as a web API that sends the request over HTTP or even simpler communication mechanisms such as SMS or text messaging. Other forms of communication channels such as satellite communication are also possible depending on applications.

The communication to the sender includes information on desired privacy.

| | Descriptor |
|---|---|
| frame_privacy_request_information( ) { | |
| fpr_num_object_classes_minus1 | u(8) |
| for(i=0; i <= fpr_num_object_classes_minus1; i++){ | u(1) |
| fpr_object_class_name_length | u(8) |
| fpr_object_class_name [fpr_object_class_name_length] | |
| fpr_prefered_object_detector_id | u(8) |
| fpp_min_confidence_of_protected_object | u(8) |
| } | |
| } | |

fpr_num_object_classes_minus1—number of object classes requested to be protected in the video minus one.

fpr_object_class_name_length—number of bytes to describe the object class name.

fpr_object_class_name-object—class name (e.g., face, person, car, book).

fpr_prefered_object_detector_id—preferred object detector to use for detecting objects. Object detectors may be identified using an index from a list of detectors described elsewhere in the bitstream. Alternatively, object detectors may be identified using a well-known name (e.g., Yolo3, detectron2). Yet another alternative is to use object detector IDs that are known to the receiver (e.g., using the product ID of the camera or video system used).

fpr_min_confidence_of_protected_object—this is integer in the range [0, 100] that indicates minimum confidence of the detector used as a threshold for scrambling/protecting an object of this class. For example, the system may protect only objects that have been detected with a confidence of 50% or higher. In that case fpr_min_confidence_of_protected_object is 50.

Figure 4:
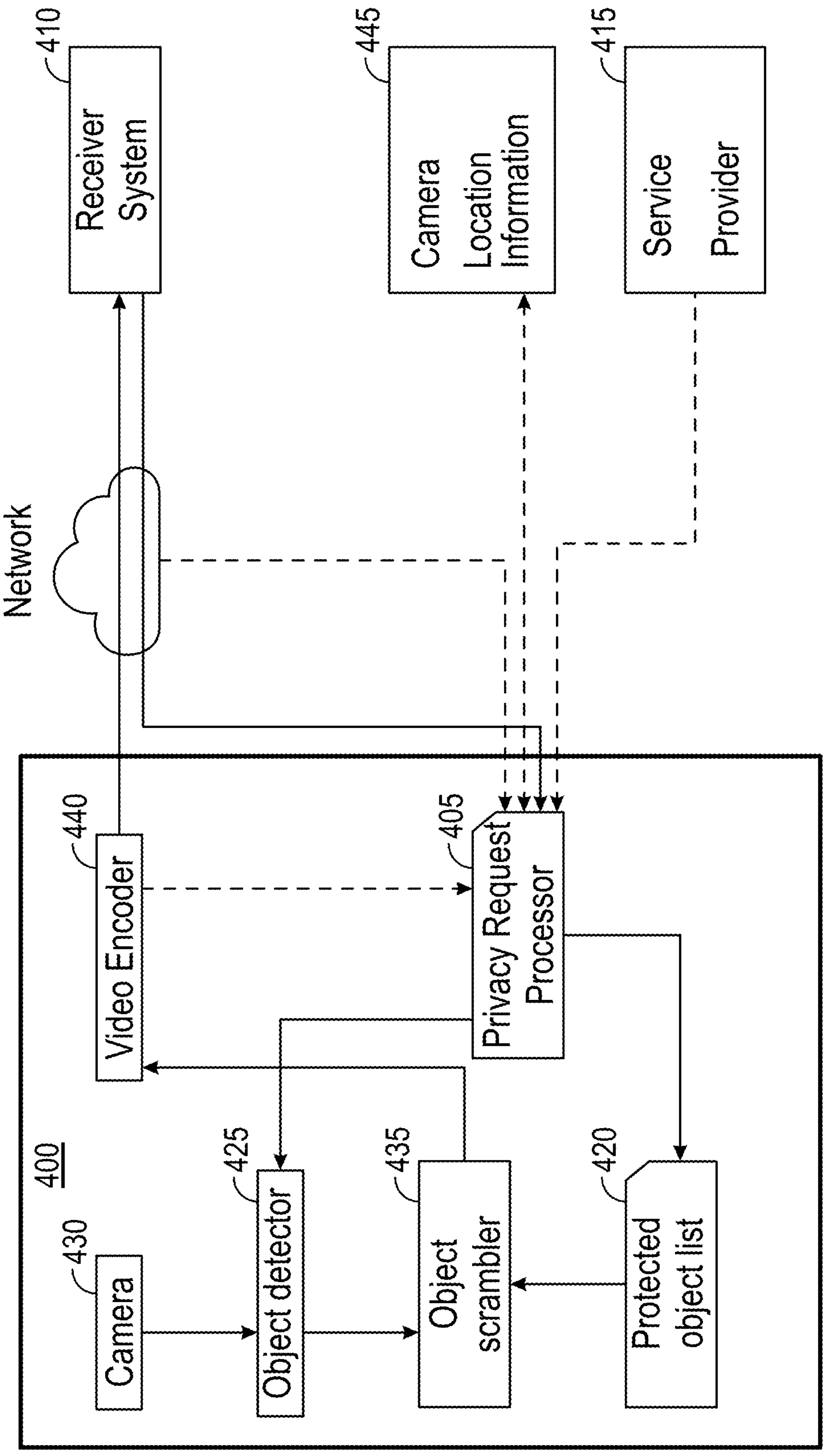
FIG. 4 is a block diagram illustrating an exemplary embodiment of a sender system.

FIG. 4 shows an exemplary embodiment of a video transmission system 400 that supports privacy protection. The privacy request processor (PRP) 405 produces a list of objects to be protected. The list of objects and privacy protection information may come from the receiver 410 or external service 415 that is connected to the system 400. Sender system 400 may include a default set of objects to be protected and that list will be used in the absence any external requests for privacy protection.

The set of objects to be protected is preferably provided to a protected object list 420 and an object detector 425. The object detector 425 receives image or frame information from a camera 430 and processes that information to detect relevant objects, such as faces, numbers, cars, etc. using processes that are generally known in the art of image processing. The set of objects to be detected may vary based on application and can include nearly any object.

An object scrambler receives the image information and detected object information from the object detector 425 and may receive a set of objects to be protected from protected object list 420. The object scrambler than processes the detected objects that match an entry on the protected object list to obscure the protected objects prior to encoding. The image information, with protected objects obscured, is then passed to a video encoder where it can be encoded and transmitted to a receiving system 410.

The physical/geographical location of sender system 400 may trigger the protection of certain identifiable information because of applicable governmental regulations. For example, surveillance camera placed in New York City may be required to hide/protect all faces in the video. Cameras located in Boston may be required to hide/protect vehicle number plates. In such cases, the location information provided to the receiver may be sufficient to create a list of protected objects. Location sensors (not shown) such as a GPS may be embedded in a device and the location information may be used to determine the list of object classes to hide/protect in a video. In the case where sender system 400 is portable, the system can dynamically modify the list of protected objects base on its current location. A pre-defined location specific object list may be included in the sender system 400. Alternatively, a sender system may use external Camera Location Information Server 445 to request a list of objects based on the camera/sender location.

Service providers 415 that provide services such as video analytics may provide object protection information to meet the service requirement for a given service area. A network element may also request privacy protection for certain classes of objects. Sender system 400 may enforce a privacy by including objects from one or more requests received in the protected object list.

Figure 5:
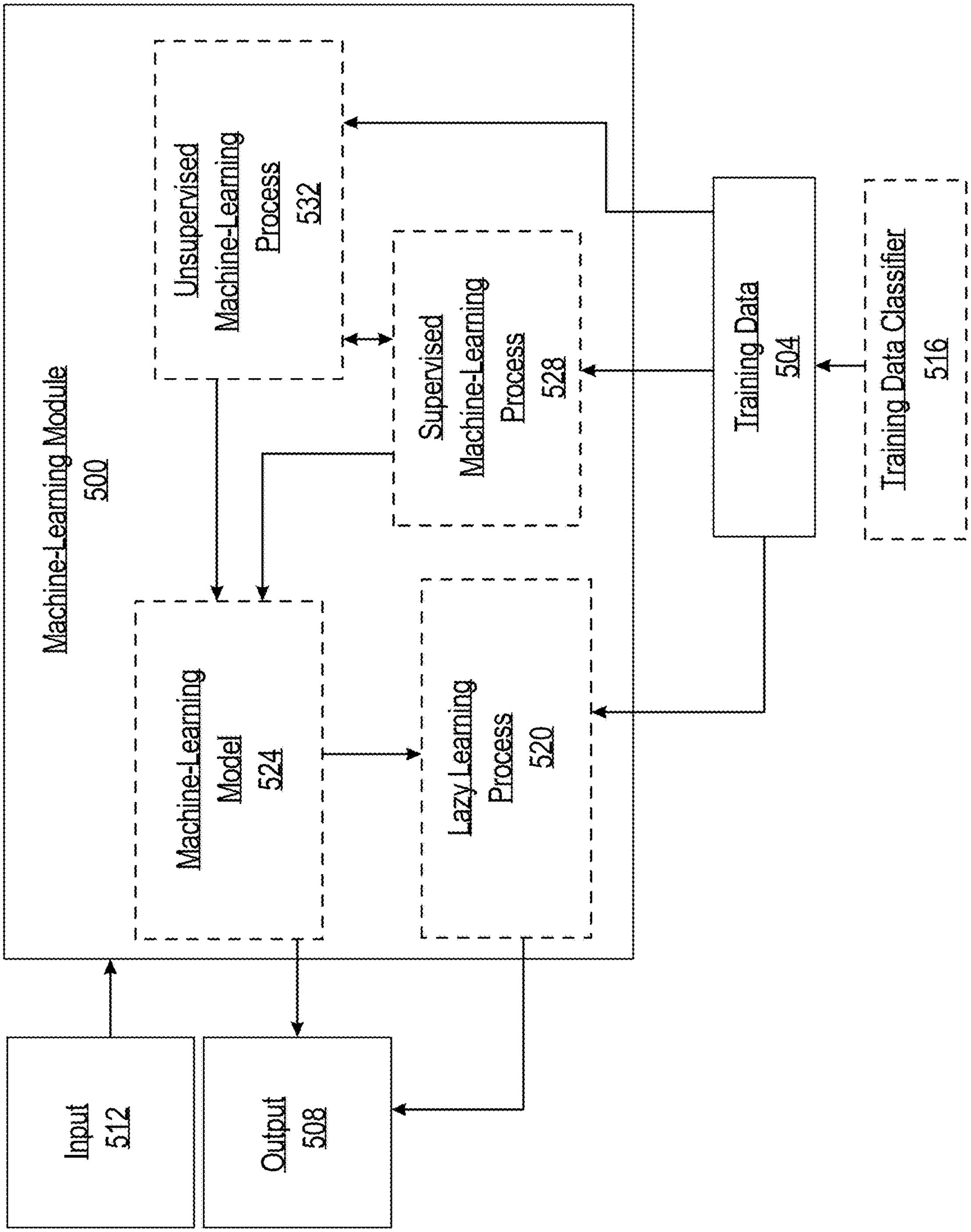
FIG. 5 is a block diagram illustrating an exemplary embodiment of a machine-learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a process whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the clastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
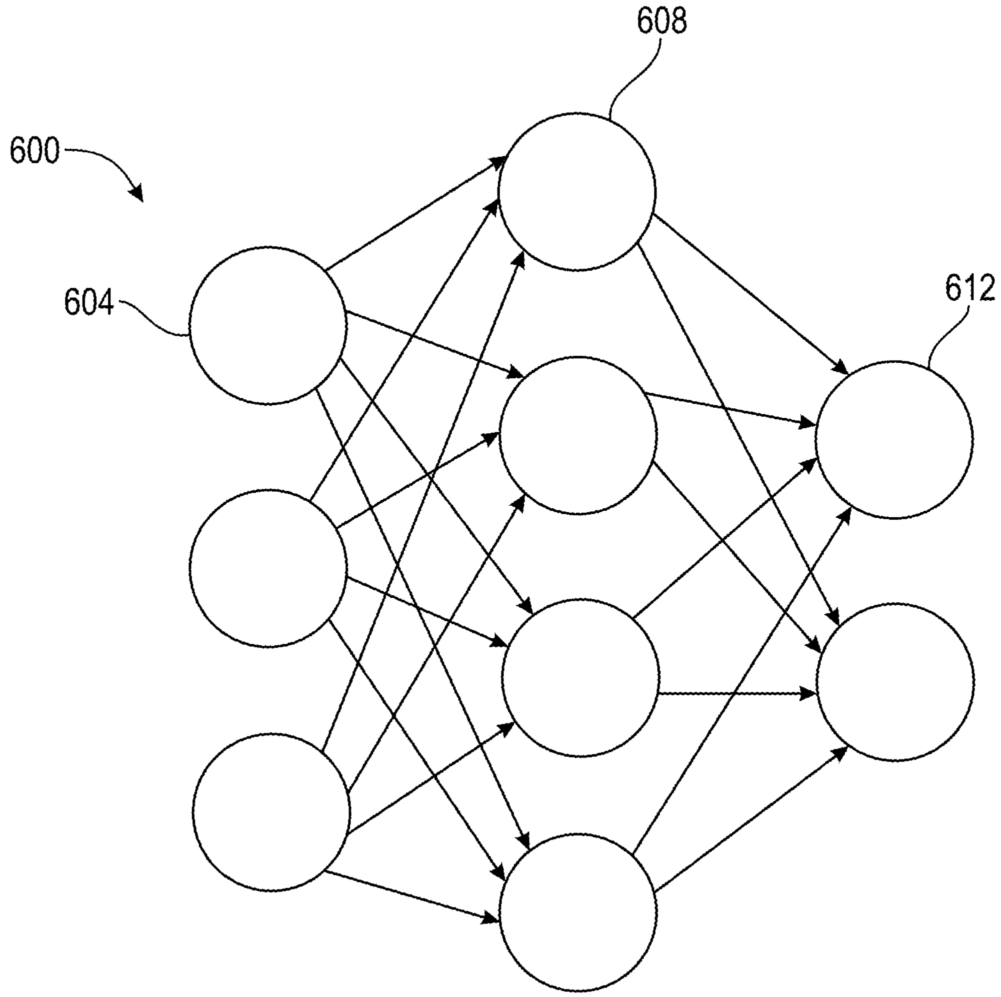
FIG. 6 is a schematic diagram illustrating an exemplary embodiment of neural network.

Referring now to FIG. 6, an exemplary embodiment of neural network 600 is illustrated. A neural network 600 also known as an artificial neural network, is a network of “nodes,” or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of “training” the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a “feed-forward” network, or may feed outputs of one layer back to inputs of the same or a different layer in a “recurrent network.”

Figure 7:
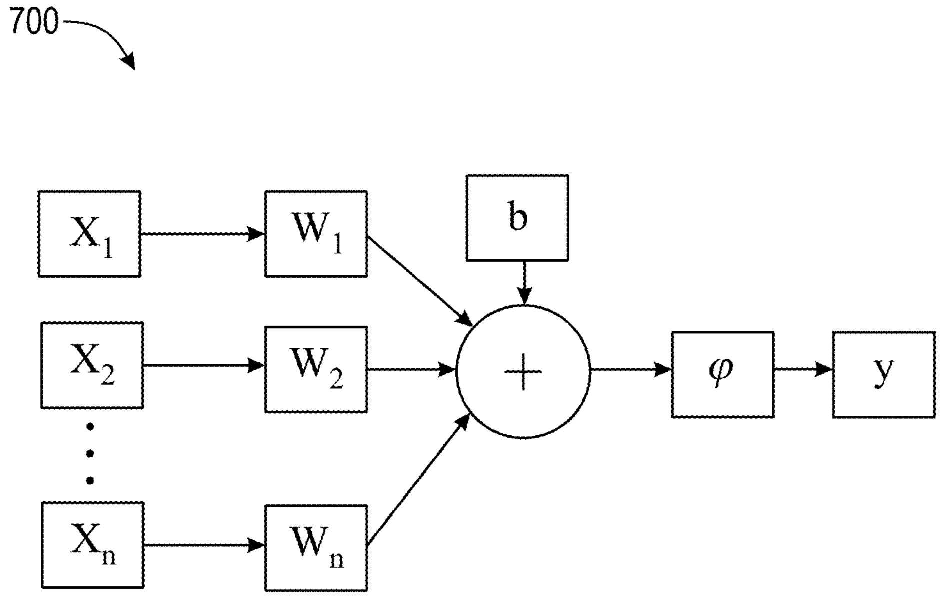
FIG. 7 is a schematic diagram illustrating an exemplary embodiment of a node of a neural network

Referring now to FIG. 7, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is “excitatory,” indicating that it has strong influence on the one or more outputs y, for instance by the corresponding weight having a large numerical value, and/or a “inhibitory,” indicating it has a weak effect influence on the one more inputs y, for instance by the corresponding weight having a small numerical value. The values of weights $w_i$ may be determined by training a neural network using training data, which may be performed using any suitable process as described above.

Figure 8:
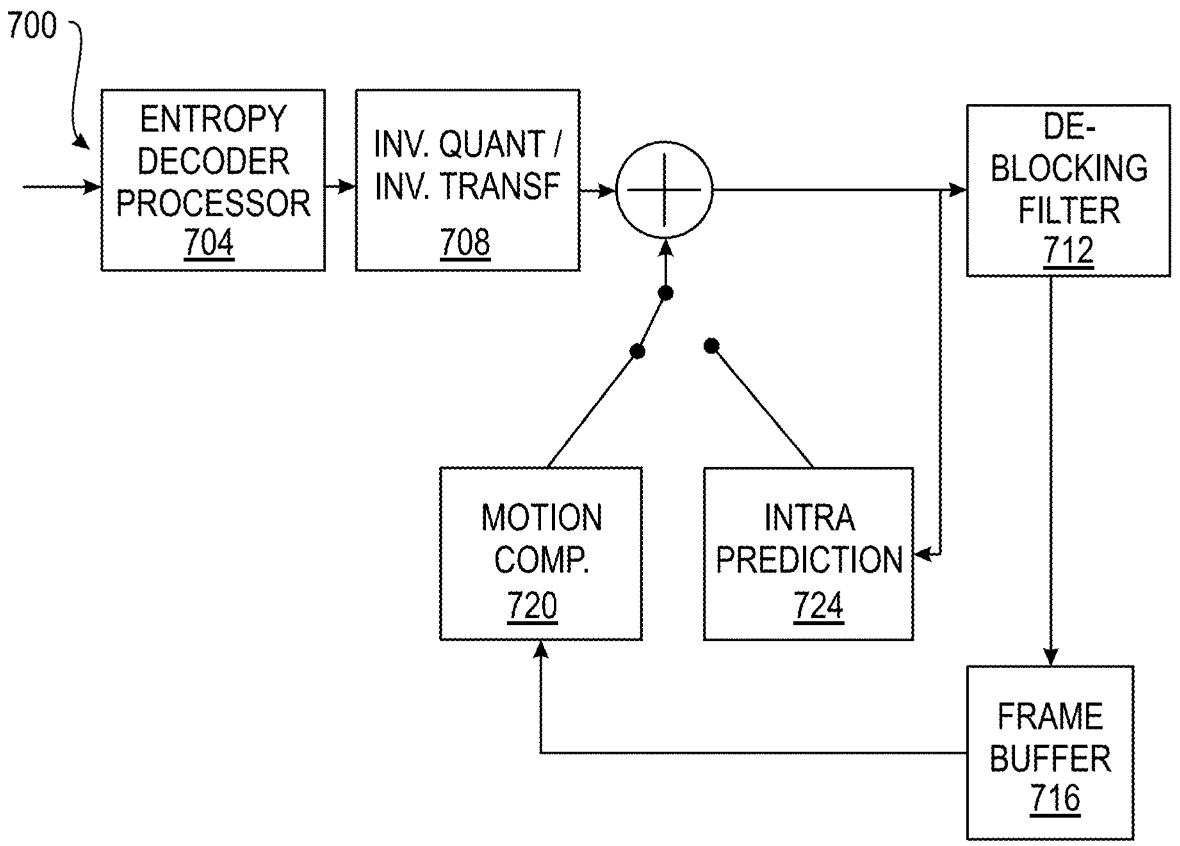
FIG. 8 is a block diagram illustrating an exemplary embodiment of a video decoder.

Still referring to FIG. 7, a “convolutional neural network,” as used in this disclosure, is a neural network in which at least one hidden layer is a convolutional layer that convolves inputs to that layer with a subset of inputs known as a “kernel,” along with one or more additional layers such as pooling layers, fully connected layers, and the like. CNN may include, without limitation, a deep neural network (DNN) extension, where a DNN is defined as a neural network with two or more FIG. 8 is a system block diagram illustrating an example decoder 800 capable of adaptive cropping. Decoder 800 may include an entropy decoder processor 804, an inverse quantization and inverse transformation processor 808, a deblocking filter 812, a frame buffer 816, a motion compensation processor 820 and/or an intra prediction processor 824.

In operation, and still referring to FIG. 8, bit stream 828 may be received by decoder 800 and input to entropy decoder processor 804, which may entropy decode portions of bit stream into quantized coefficients. Quantized coefficients may be provided to inverse quantization and inverse transformation processor 808, which may perform inverse quantization and inverse transformation to create a residual signal, which may be added to an output of motion compensation processor 820 or intra prediction processor 824 according to a processing mode. An output of the motion compensation processor 820 and intra prediction processor 824 may include a block prediction based on a previously decoded block. A sum of prediction and residual may be processed by deblocking filter 812 and stored in a frame buffer 816.

In an embodiment, and still referring to FIG. 8 decoder 800 may include circuitry configured to implement any operations as described above in any embodiment as described above, in any order and with any degree of repetition. For instance, decoder 800 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Decoder may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 9:
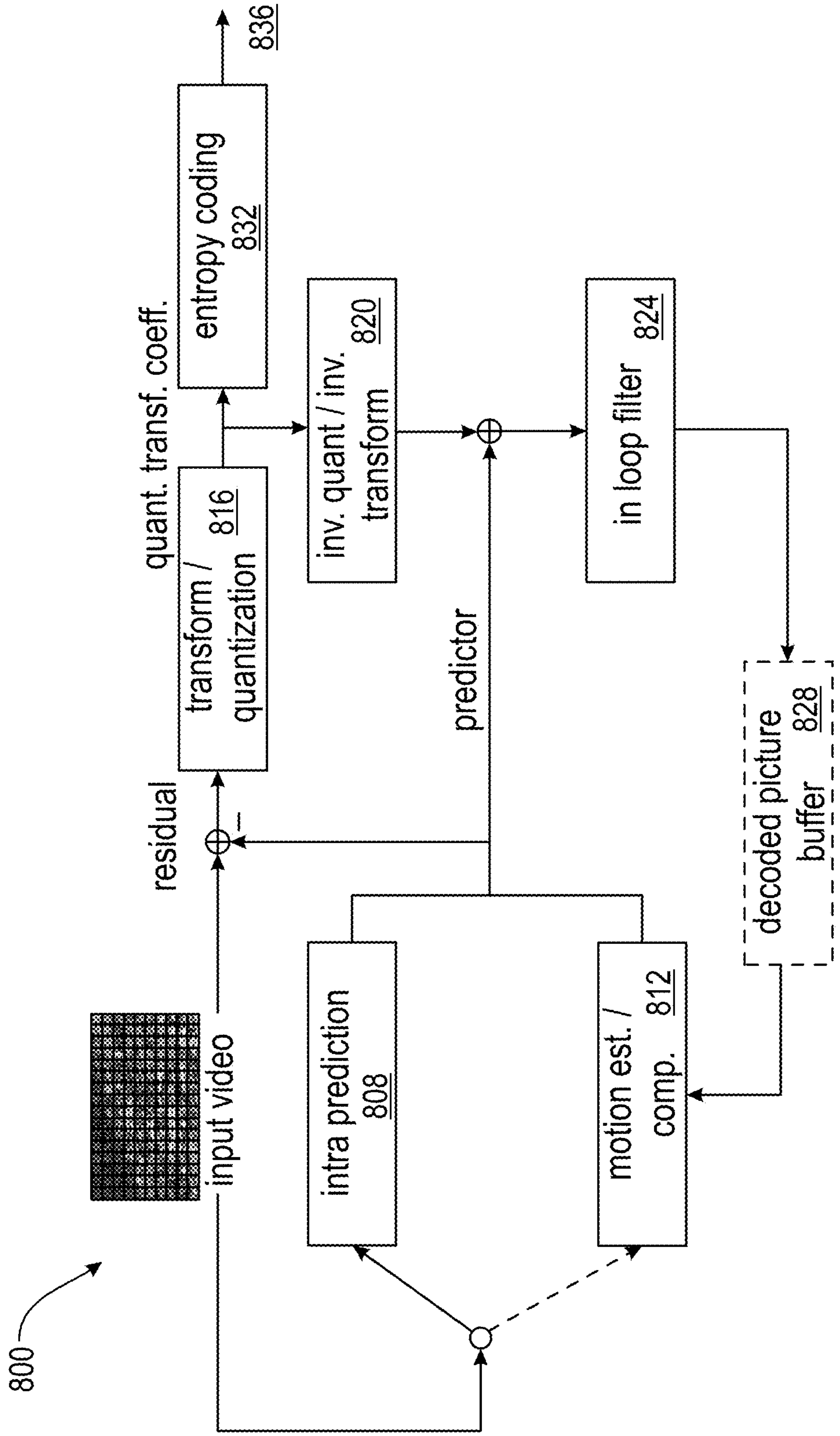
FIG. 9 is a block diagram illustrating an exemplary embodiment of a video encoder.

FIG. 9 is a system block diagram illustrating an example video encoder 900 capable of adaptive cropping. Example video encoder 900 may receive an input video 904, which may be initially segmented or dividing according to a processing scheme, such as a tree-structured macro block partitioning scheme (e.g., quad-tree plus binary tree). An example of a tree-structured macro block partitioning scheme may include partitioning a picture frame into large block elements called coding tree units (CTU). In some implementations, each CTU may be further partitioned one or more times into a number of sub-blocks called coding units (CU). A final result of this portioning may include a group of sub-blocks that may be called predictive units (PU). Transform units (TU) may also be utilized.

Still referring to FIG. 9, example video encoder 900 may include an intra prediction processor 908, a motion estimation/compensation processor 912, which may also be referred to as an inter prediction processor, capable of constructing a motion vector candidate list including adding a global motion vector candidate to the motion vector candidate list, a transform/quantization processor 916, an inverse quantization/inverse transform processor 920, an in-loop filter 924, a decoded picture buffer 928, and/or an entropy coding processor 932. Bit stream parameters may be input to the entropy coding processor 932 for inclusion in the output bit stream 936.

In operation, and with continued reference to FIG. 9, for each block of a frame of input video, whether to process block via intra picture prediction or using motion estimation/compensation may be determined. Block may be provided to intra prediction processor 908 or motion estimation/compensation processor 912. If block is to be processed via intra prediction, intra prediction processor 908 may perform processing to output a predictor. If block is to be processed via motion estimation/compensation, motion estimation/compensation processor 912 may perform processing including constructing a motion vector candidate list including adding a global motion vector candidate to the motion vector candidate list, if applicable.

Further referring to FIG. 9, a residual may be formed by subtracting a predictor from input video. Residual may be received by transform/quantization processor 916, which may perform transformation processing (e.g., discrete cosine transform (DCT)) to produce coefficients, which may be quantized. Quantized coefficients and any associated signaling information may be provided to entropy coding processor 932 for entropy encoding and inclusion in output bit stream 936. Entropy encoding processor 932 may support encoding of signaling information related to encoding a current block. In addition, quantized coefficients may be provided to inverse quantization/inverse transformation processor 920, which may reproduce pixels, which may be combined with a predictor and processed by in loop filter 924, an output of which may be stored in decoded picture buffer 928 for use by motion estimation/compensation processor 912 that is capable of constructing a motion vector candidate list including adding a global motion vector candidate to the motion vector candidate list.

With continued reference to FIG. 9, although a few variations have been described in detail above, other modifications or additions are possible. For example, in some implementations, current blocks may include any symmetric blocks (8×8, 16×16, 32×32, 64×64, 128×128, and the like) as well as any asymmetric block (8×4, 16×8, and the like).

In some implementations, and still referring to FIG. 9, a quadtree plus binary decision tree (QTBT) may be implemented. In QTBT, at a Coding Tree Unit level, partition parameters of QTBT may be dynamically derived to adapt to local characteristics without transmitting any overhead. Subsequently, at a Coding Unit level, a joint-classifier decision tree structure may eliminate unnecessary iterations and control the risk of false prediction. In some implementations, LTR frame block update mode may be available as an additional option available at every leaf node of QTBT.

In some implementations, and still referring to FIG. 9, additional syntax elements may be signaled at different hierarchy levels of bitstream. For example, a flag may be enabled for an entire sequence by including an enable flag coded in a Sequence Parameter Set (SPS). Further, a CTU flag may be coded at a coding tree unit (CTU) level.

Some embodiments may include non-transitory computer program products (i.e., physically embodied computer program products) that store instructions, which when executed by one or more data processors of one or more computing systems, cause at least one data processor to perform operations herein.

Still referring to FIG. 9, encoder 900 may include circuitry configured to implement any operations as described above in any embodiment, in any order and with any degree of repetition. For instance, encoder 900 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Encoder 900 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 9, non-transitory computer program products (i.e., physically embodied computer program products) may store instructions, which when executed by one or more data processors of one or more computing systems, causes at least one data processor to perform operations, and/or steps thereof described in this disclosure, including without limitation any operations described above and/or any operations decoder 900 and/or encoder 900 may be configured to perform. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, or the like.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
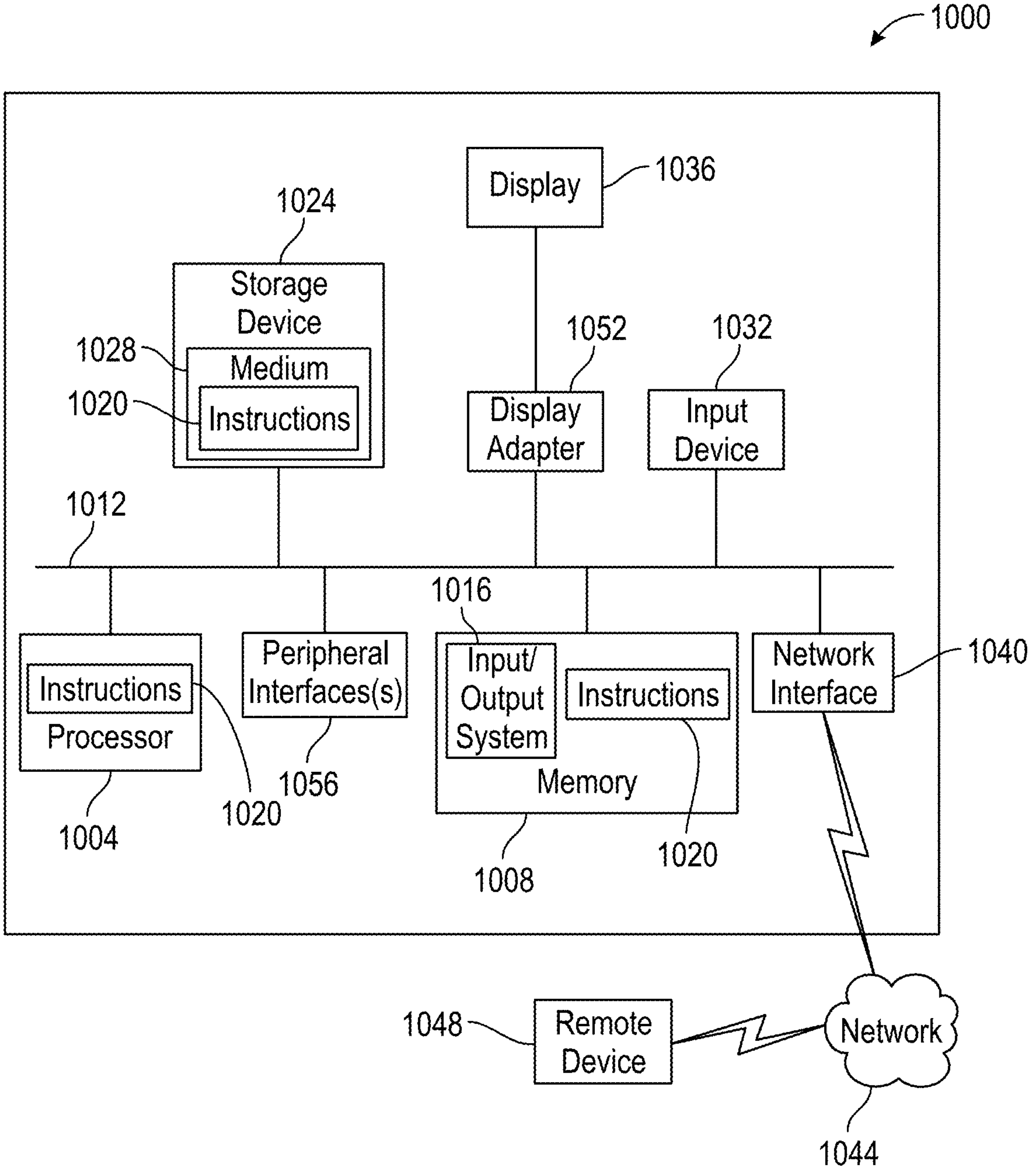
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC)

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An image transmission system with privacy protection comprising:

a privacy request processor, the privacy request processor receiving a request to secure at least one object type in an image prior to transmission of the image to a receiving system;

a camera generating image data;

an object detector receiving the image data from the camera and processing the image data to identify at least one predetermined object type in the image data;

an object scrambler, the object scrambler receiving a set of protected objects from the privacy request processor and receiving the image data with identified objects of the predetermined object type, the object scrambler obscuring the image data for any identified objects identified as protected objects; and an encoder, the encoder receiving the image data with obscured protected objects and generating encoded bitstream therefrom, the encoded bitstream includes frame level parameters related to the applied privacy protection used to obscure the image data, wherein the frame level parameters include a frame level flag indicating whether the bitstream provides privacy protection for a frame, the frame level parameters further including one or more of the number of object classes protected, names of the object classes protected, number of objects in each class protected.

2. The image transmission system of claim 1, wherein the at least one object type to secure is determined at least in part by a location of the system.

3. The image transmission system of claim 1, wherein the privacy request processor has a default set of object types to secure.

4. The image transmission system of claim 1, wherein the privacy request processor receives a set of object types to secure from a service provider.

5. The image transmission system of claim 1, wherein the parameters are signaled in each picture header.

6. The image transmission system of claim 1, wherein the parameters are signaled in a supplemental enhancement information (SEI) stream.

7. The image transmission system of claim 1 wherein the frame level parameters include a number of objects in each class detected, and a confidence threshold for determining that an object detected will be protected.

* * * * *